United States Patent [19]

Schulz

[11] Patent Number: 4,642,863
[45] Date of Patent: Feb. 17, 1987

[54] MANUFACTURING METHOD FOR HOLLOW METAL AIRFOIL TYPE STRUCTURE

[75] Inventor: David W. Schulz, Belmont, Calif.

[73] Assignee: Ontario Technologies Corporation, Menlo Park, Calif.

[21] Appl. No.: 723,630

[22] Filed: Apr. 15, 1985

[51] Int. Cl.$^4$ .......................... B21K 3/04; B23P 15/02; B23K 20/18

[52] U.S. Cl. .......................... 29/156.8 B; 29/156.8 H; 29/527.2; 29/DIG. 4; 29/DIG. 25; 228/118; 228/157; 416/232; 416/233

[58] Field of Search .................... 29/156.8 R, 156.8 B, 29/156.8 H, 527.2, DIG. 4, DIG. 25; 156/156, 173, 189, 245, 285, 293; 228/157, 118; 416/223 R, 232, 233

[56] References Cited

U.S. PATENT DOCUMENTS

| | | | |
|---|---|---|---|
| 2,221,548 | 11/1940 | Lampton | 416/232 X |
| 2,759,246 | 8/1956 | Campbell | 29/156.8 H |
| 3,061,924 | 11/1962 | Brick et al. | 228/118 X |
| 3,623,204 | 11/1971 | Wagle | 29/156.8 B X |
| 3,650,005 | 3/1972 | Kamiya et al. | 29/527.2 X |
| 3,653,110 | 4/1972 | King, Jr. et al. | 29/156.8 B X |
| 3,902,944 | 9/1975 | Ashton et al. | 156/156 |
| 4,043,498 | 8/1977 | Conn, Jr. | 228/157 X |
| 4,169,749 | 10/1979 | Clark | 156/156 |
| 4,220,276 | 9/1980 | Weisert et al. | 228/118 |
| 4,292,375 | 9/1981 | Ko | 228/157 X |
| 4,348,247 | 9/1982 | Loyd et al. | 156/156 |
| 4,361,262 | 11/1982 | Israeli | 228/157 X |
| 4,429,824 | 2/1984 | Woodward | 228/157 |
| 4,512,069 | 4/1985 | Hagemeister | 29/156.8 B |

FOREIGN PATENT DOCUMENTS

| | | | |
|---|---|---|---|
| 25468 | 3/1976 | Japan | 228/157 |
| 1398929 | 6/1975 | United Kingdom | 228/157 |

Primary Examiner—Howard N. Goldberg
Assistant Examiner—Ronald S. Wallace
Attorney, Agent, or Firm—Fliesler, Dubb, Meyer & Lovejoy

[57] ABSTRACT

A process is set forth for making a structure formed of at least two metallic workpiece sections each formed of a reactive metal. A mandrel having a nonreactive surface is sandwiched between the workpiece sections thereby preventing them from being in contact over a first selected area and allowing them to be in facing relation over a second selected area. A reactive metal contact is formed of the workpiece sections over the second selected area. The workpiece sections are maintained under coordinated temperature-pressure-time duration conditions to diffusion bond them at the second selected area. A gas pressure differential is applied between intermediate the workpiece sections and external of the workpiece sections to cause breakthrough at the first selected area and superplastic forming of at least one of the workpiece sections causing it to stretch in excess of its original surface area. The mandrel is removed from between the workpiece sections. The process provides structures such as airfoils having leading edges and trailing edges of controlled weight and internal radii.

12 Claims, 4 Drawing Figures

MANUFACTURING METHOD FOR HOLLOW METAL AIRFOIL TYPE STRUCTURE

TECHNICAL FIELD

The present invention relates to hollow airfoil type structures. More particularly, the invention relates to a method for making hollow airfoil type structures utilizing an improved diffusion bonding-superplastic forming technique.

BACKGROUND ART

The production of metallic structures having internal cavities by superplastic forming and diffusion bonding (SPF/DB) is well known. For example, Weisert, et al, describe one method for obtaining such structures in U.S. Pat. No. 4,220,276, issued Sept. 2, 1980. In the method described in that patent yttria of a specific particle size is coated on those areas of two titanium sheets where bonding is not desired and other areas of the sheet are not coated with yttria. The sheets are placed in a sandwiched arrangement and are subjected to coordinated temperature-pressure-time duration conditions to produce diffusion bonding of the workpieces other than where they are coated with the yttria. Gas pressure is applied between the contacting surfaces to cause breakthrough in the area coated with yttria and superplastic forming of at least one of the workpieces, causing it to stretch substantially in excess of its original surface area.

The above described technique will produce a number of useful hollow metallic structures. However, this method does not provide good control of the internal diameter of the enclosed cavity in the area where the diffusion bonding takes place. In certain instances such is particularly desirable. For example, if one is making an airfoil having a leading edge and a trailing edge, it is desirable that the leading edge and trailing edge be relatively heavy and be uniform, including having a uniform internal diameter at the enclosed cavity. Yet, it is also desirable that the sides of the airfoil be relatively thin such as is produced by superplastic forming. Indeed, SPF/DB has not been able to produce such structures in the past. Instead, one has had to utilize precision casting which is limiting in that it does not have the ability to produce sufficiently thin walls and is subject to having alpha case structuring on its internal surfaces, or to utilize hot diffusion bonding in vacuum which is of limited usefulness because of restrictions to internal airflow or to utilize conventional fabrication methods which are costly, result in undesirable joints and provide undesirably heavy airfoil structures.

DISCLOSURE OF INVENTION

The present invention is directed to overcoming one or more of the problems as set forth above.

In accordance with the present invention, a process is set forth for making a structure formed from at least two metallic workpiece sections each of which is formed of a reactive metal. A mandrel having a non-reactive surface is sandwiched between the workpiece sections in a position which prevents the workpiece sections from being in contact over a first selected area and allows the workpiece sections to be in reactive metal contact over a second selected area. The workpiece sections are maintained under coordinated temperature-pressure-time duration conditions to produce diffusion bonding of the workpiece sections at the second selected area. A gas pressure differential is applied between intermediate the workpiece sections and external of the workpiece sections to cause breakthrough at the first selected area and superplastic forming of at least one of the workpiece sections, stretching it in excess of its original surface area. The mandrel is then removed from between the workpiece sections.

When one operates in accordance with the present invention the leading edge and trailing edge of the mandrel provide precise control of the internal diameter of the internal chamber or cavity formed at the leading edge and trailing edge of the structure. This is particularly useful when the structure is an airfoil. Yet, the sidewalls of the airfoil can be as thin as are attainable by the SPF/DB process. In accordance with one embodiment of the invention the mandrel can be reused after removal. In accordance with another embodiment of the present invention the mandrel may be frangible whereby it can be broken and removed from the internal chamber. Alternatively, the mandrel can be constructed of a material (e.g., alumina) selected to be soluble in a suitable medium (e.g., molten caustic) and can be removed by dissolution. Relatively light weight inexpensive airfoils result which have very closely controlled internal diameters at their leading edge and their trailing edge and which are relatively heavy at their leading edge and their trailing edge, thus providing a desired large moment of inertia.

BRIEF DESCRIPTION OF THE DRAWINGS

The invention will be better understood by reference to the figures of the drawings wherein like numbers denote like parts throughout and wherein.

BEST MODE FOR CARRYING OUT INVENTION

A number of alloys exhibit superplasticity and are capable of being subjected to superplastic forming to produce parts of predetermined shapes. Superplasticity is the capability of a material to develop unusually high tensile elongation with reduced tendency toward local necking during deformation. However, this invention is particularly concerned with superplastic metals which are subject to contamination of surface integrity at forming temperatures. These are termed "reactive" metals. This term includes alloys of titanium, zirconium and other refractory metals. alloys of titanium, zirconium and other refractory metals.

Diffusion bonding refers to the solid-state, metallurgical joining of surfaces of similar or dissimilar metals by applying heat and pressure for a time duration so as to effect intimate surface contact and cause co-mingling of atoms at the joint interface.

In order to produce structures having interior chambers by SPF/DB, metal blanks, preferably of a titanium alloy, are joined at selected areas by diffusion bonding at elevated temperatures and pressures and are then subjected to superplastic forming to form the desired structure. The metal blanks are first treated at selected areas with a stopoff material, such as yttria, boron nitride, graphite or alumina, to prevent bonding at such treated areas during diffusion bonding. During superplastic forming the metal blanks are expanded at the treated (unbonded) areas and brought into contact with shaping members by increasing the internal pressure, preferably with inert gas, thus forming an expanded structure of a desired shape, essentially in a single operation. For such superplastic forming to occur, gas must penetrate the entire interior network of unbonded (stopped off) areas.

Figure 1:
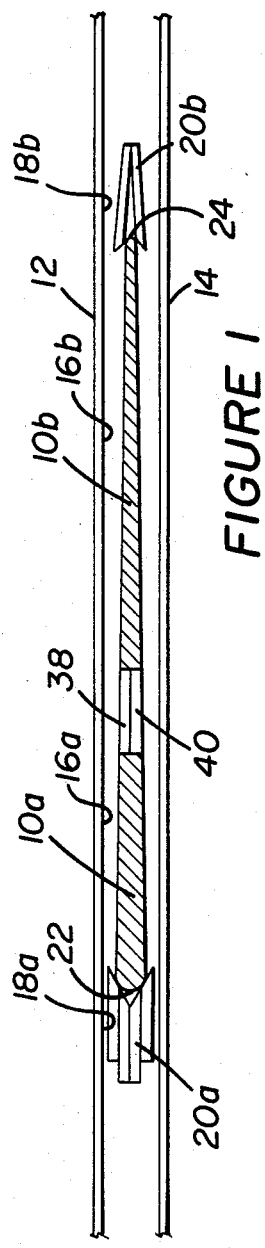
FIG. 1 illustrates, in side section, a sandwiching step in accordance with an embodiment of the present invention.
Figure 2:
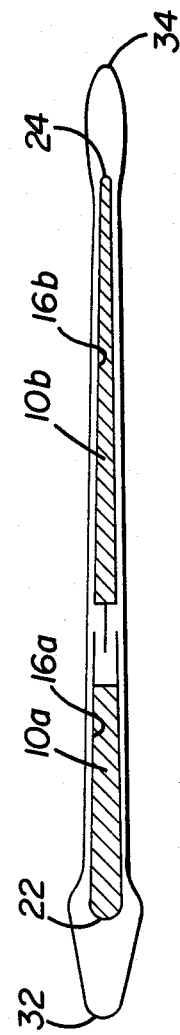
FIG. 2 illustrates, in side section, a diffusion bonding step in accordance with the present invention.
Figure 3:
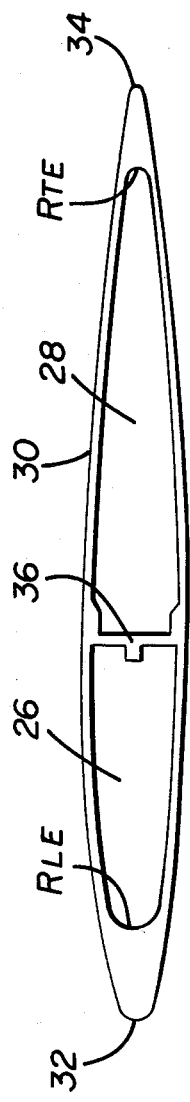
FIG. 3 illustrates, in side section, a structure formed in accordance with the process of the present invention.

In accordance with the present invention, and as is illustrated in FIGS. 1-3, a mandrel 10a or 10b (FIGS. 1-4 show the use of two mandrels 10a and 10b) which has a nonreactive surface is sandwiched between at least two metallic workpiece sections, 12 and 14, which sections can be parts of two distinct metallic workpieces or can be sections of a single metallic workpiece which is folded over. The mandrel, 10a or 10b, is located in a position which prevents the workpiece sections 12,14 from being in contact over a first selected area 16a,16b and allows the workpiece sections 12,14 to be in facing relation over a second selected area 18a,18b.

A reactive metal contact is formed of the workpiece sections 12,14 over the second selected area 18a,18b. In the particular embodiment illustrated this is accomplished at the second selected areas 18a and 18b by positioning reactive metal fillers 20a or 20b between the workpiece sections 12,14 at the second selected areas 18a,18b and in contact with a leading portion 22 of the mandrel 10a and a trailing portion 24 of the mandrel 10b. In a manner which will become apparent the leading portion 22 of the mandrel 10a serves to define an interior radius of curvature, $R_{LE}$ seen in FIG. 3 and the trailing portion 24 of the mandrel 10b defines an interior radius of curvature $R_{TE}$, respectively of the interior cavities or chambers 26 and 28 of an airfoil structure 30 which is formed from the workpiece sections 12 and 14 and the fillers 20a and 20b. If desired, the multipiece fillers 20a and 20b can be replaced with premachined onepiece fillers.

FIG. 2 illustrates the process step wherein the workpiece sections 12 and 14 have been maintained under coordinated temperature-pressure-time duration conditions to produce diffusion bonding of the workpiece sections 12,14 at the second selected areas 18a and 18b.

FIG. 3 illustrates the airfoil structure 30 which is formed following applying of a gas pressure differential between intermediate the workpiece sections 12 and 14 and external of the workpiece sections 12 and 14 to cause breakthrough at the first selected areas 16a or 16b and superplastic forming of at least one of the workpiece sections 12 and 14 to stretch substantially in excess of its original surface area. As may be seen in FIG. 3 the mandrels 10a and 10b have been removed. Also, in both FIGS. 2 and 3, excess portions of the workpiece sections 12 and 14 which would extend beyond the airfoil structure 30 have been removed from the leading edge 32 and the trailing edge 34.

The mandrel 10a,10b can be removed from between the workpiece sections 12 and 14 by simply cutting across these sections to form a cross section as seen in FIG. 3 and sliding the mandrels outwardly. Alternatively, the mandrels 10a and 10b may be made of a fragile material and may be broken in place and then washed or dissolved out utilizing a suitable fluid.

In the particular embodiment illustrated in FIGS. 1-3 a central stiffener 36 is provided as a part of the airfoil structure 30. The stiffener 36 is formed from two pieces of reactive metal alloy strips 38 and 40 which are caused to diffusion bond to the workpiece sections 12 and 14 and to one another during the aforedescribed SDF/DB process. Those portions of the strips 38,40 which are not to be diffusion bonded together or to the workpiece sections 12 and 14 are generally treated with a release agent to prevent such diffusion bonding. The result of carrying out the process of FIGS. 1-3 is a single airfoil structure 30 having two interior chambers 26 and 28 and being internally stiffened by the stiffener 36.

Figure 4:
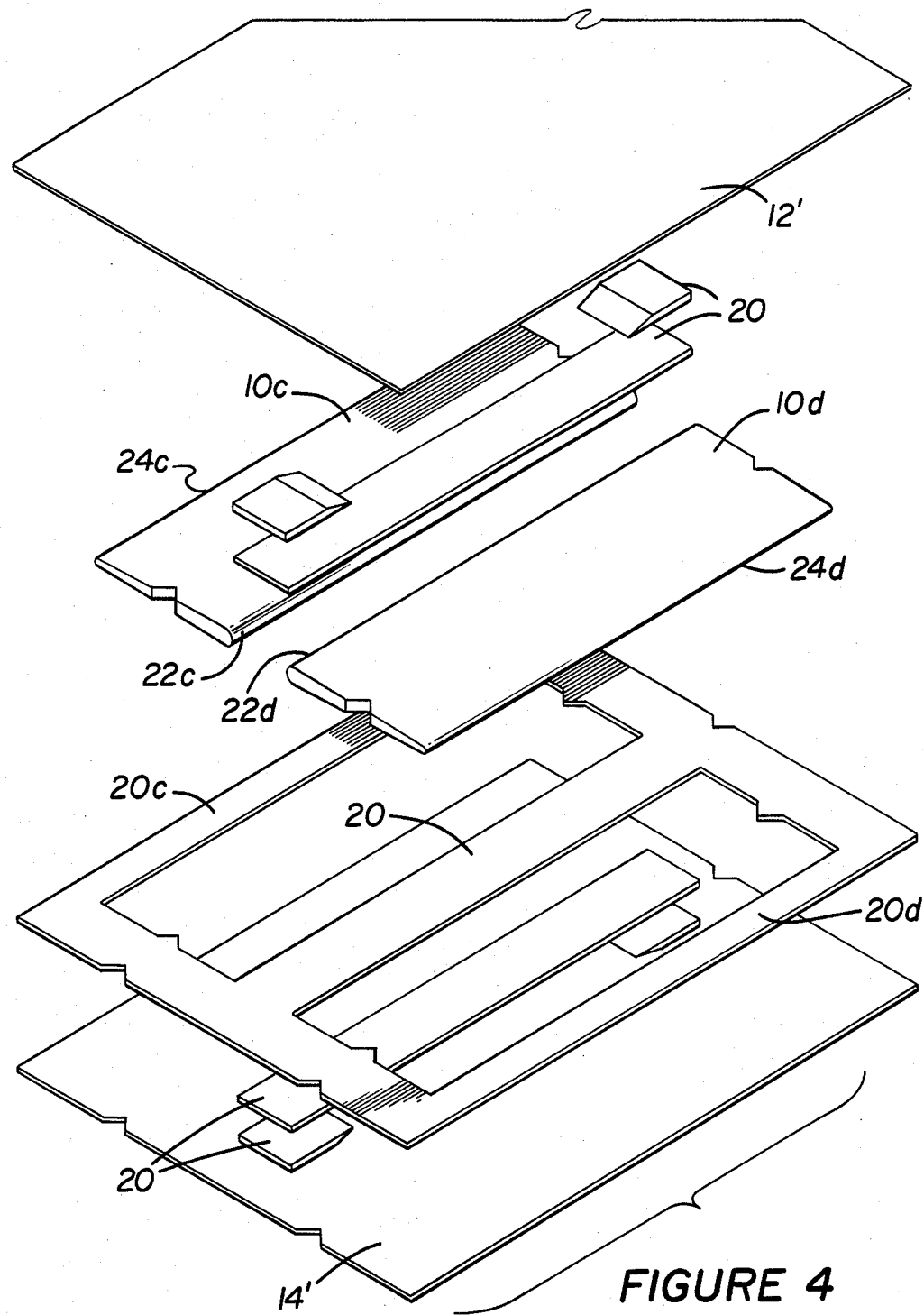
FIG. 4 illustrates, in exploded perspective, a sandwich assembly in accordance with an embodiment of the present invention.

FIG. 4 shows an embodiment of the present invention wherein two airfoil structures are formed using two identical mandrels each defining the interior radius of curvature of a leading edge and a trailing edge of separate airfoil structures. In the embodiemnt of FIG. 4 the sheet 12' fits atop the mandrels 10c and 10d with fillers 20, 20c and 20d serving to provide buildup at the leading portions 22c and 22d and at the trailing portions 24c and 24d of the mandrels 10c and 10d. The fillers also serve to properly position the mandrels 10c and 10d. Following carrying out of a process as set forth above two different airfoil structures result. Various notches are provided to assure proper alignment.

Generally, the surface of the mandrels are coated with a release agent such as yttria, boron nitride, graphite or alumina, to prevent bonding of the mandrels to the sheets 12 and 14 during diffusion bonding. Preferably such treatment would be with yttria or boron nitride. A structure as shown in FIG. 1 would then be bonded by applying an inert gas, e.g., argon, equally on the two workpiece sections 12 and 14 at a suitable bonding pressure, usually from about 300 to about 600 psi, for 1 to 3 hours, at a temperature of from about 1600° F. (870° C.) to about 1700° F. (930° C.), more generally at about 1650° F. (900° C.). During this process the internal parts of the package as seen in FIG. 1 are protected by an inert atmosphere such as argon or by vacuum. When bonded, the pack will assume a shape similar to that seen in FIG. 2. Excess material is removed during trimming and the leading edge 32 and trailing edge 34 may be premachined or radiused at that time. Next, an inert gas is introduced conventionally between the first selected areas 16a and 16b to cause breakthrough and superplastic forming. In essence, the bonded pack as seen in FIG. 2 is inserted in a heated die set having a cavity of the desired final configuration, stabilized at the superplastic forming temperature, usually in the range from about 1600° F. to about 1700° F. preferably about 1650° F., the inert gas, e.g., argon, is injected to the first selected area 16a and 16b at a controlled rate and pressurized to inflate the pack until it conforms to the die shape. After the pressurization the airfoil structure 30 is removed from the heated die and is cooled to room temperature. The airfoil structure 30 may then be chemically milled to remove external alpha case or may be machined. Lastly, the ends are cut off of the airfoil structure 30 and the mandrels 10a and 10b are removed by sliding them out.

Industrial Applicability

A process in accordance with the present invention is useful for forming airfoil structures 30 having leading edges 32 and trailing edges 34 which have been built up to be relatively heavy and which have controlled interior radiuses of curvature $R_{LE}$ and $R_{TE}$ at the leading edge 32 and trailing edge 34, respectively.

I claim:

1. A process for making a structure formed of at least two metallic workpiece sections each of which is formed of a reactive metal, comprising:

sandwiching a mandrel having a non-reactive surface between said workpiece sections in a position which prevents said workpiece sections from being in contact over a first selected area and allows said workpiece sections to be in facing relation over a second selected area;

forming a reactive metal contact of said workpiece sections over said second selected area;

maintaining said workpiece sections under coordinated temperature-pressure-time duration conditions to produce diffusion bonding of said workpiece sections at said second selected area;

applying a gas pressure differential between intermediate the workpiece sections and external of the workpiece sections to cause breakthrough at said first selected area and superplastic forming of at least one of said workpiece sections causing it to stretch in excess of its original surface area; and removing said mandrel from between said workpiece sections.

2. A process as set forth in claim 1, wherein said nonreactive surface of said mandrel is coated with a release agent.

3. A process as set forth in claim 2, wherein said release agent comprises yttria, boron nitride, graphite or alumina.

4. A process as set forth in claim 1, wherein said structure comprises an airfoil having a leading edge and a trailing edge and wherein said mandrel has a leading portion which defines an interior radius of curvature of said leading edge and a trailing portion which defines an interior radius of curvature of said trailing edge.

5. A process as set forth in claim 1, wherein said removing step comprises cutting open said structure and pulling said mandrel from the resulting opening.

6. A process as set forth in claim 1, wherein said mandrel is frangible and wherein said removing step comprises breaking said mandrel within said structure and utilizing a fluid to wash the resulting debris from the interior of said structure.

7. A process as set forth in claim 1, wherein said mandrel is soluble in a suitable medium and wherein said removing step comprises dissolving said mandrel partially or completely and thereby effecting or enabling removal of said mandrel.

8. A process as set forth in claim 7, wherein said reactive metal is a titanium alloy.

9. A process as set forth in claim 1, including utilizing a breakthrough pressure-time product sufficiently low to produce a structure containing an expanded portion of uniform cross-section and substantially free of local strains and ruptures.

10. A process as set forth in claim 9, wherein the temperature is maintained within a range from about 870° C. to about 930° C. during said diffusion bonding and said superplastic forming, and said pressure during said diffusion bonding is between about 300 psi and about 600 psi.

11. A process as set forth in claim 1, wherein said forming step further includes positioning at least one additional reactive metal piece between said workpiece sections at said second selected area.

12. A process as set forth in claim 1, including, prior to said maintaining step, the added step of positioning one or more reactive metal strips between said workpiece sections at a portion of said first selected area, said reactive metal strips forming a stiffener between said workpiece sections during said gas pressure differential applying step.

* * * * *